(12) United States Patent
Antony (10) Patent No.: US 9,699,252 B2
(45) Date of Patent: Jul. 4, 2017

(54) DEPLOYMENT OF VIRTUAL MACHINE DISKS FROM A SHARED NETWORK FILE SYSTEM

(71) Applicant: VMWARE, INC., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 352 days.

(21) Appl. No.: 14/451,454

(22) Filed: Aug. 5, 2014

(65) Prior Publication Data
US 2015/0373102 A1  Dec. 24, 2015

(30) Foreign Application Priority Data

Jun. 24, 2014  (IN) .......................... 3070/CHE/2014

(51) Int. Cl.
*H04L 29/08* (2006.01)
*H04L 12/24* (2006.01)
*G06F 9/455* (2006.01)

(52) U.S. Cl.
CPC ...... *H04L 67/1095* (2013.01); *G06F 9/45558* (2013.01); *H04L 41/0806* (2013.01); *H04L 67/1097* (2013.01); *G06F 2009/45562* (2013.01); *G06F 2009/45579* (2013.01)

(58) Field of Classification Search
CPC ............ H04L 67/1095; H04L 67/1097; H04L 41/0806; G06F 9/45558; G06F 8/65; G06F 8/63; G06F 9/5088
USPC ......................................................... 709/219
See application file for complete search history.

(56) References Cited

U.S. PATENT DOCUMENTS

| 2013/0097319 | A1* | 4/2013 | Ahmad | G06F 9/5033 709/226 |
| 2014/0281217 | A1* | 9/2014 | Beam | G06F 3/0607 711/114 |

* cited by examiner

*Primary Examiner* — Tu Nguyen (57) ABSTRACT

Techniques for deployment of virtual machine disks (VM-DKs) in a virtualized computing environment are disclosed. In one embodiment, a request to deploy a VMDK to a virtual machine (VM) is received. The VMDK includes a master virtual disk file and at least one data virtual disk file. Further, the master virtual disk file is copied from a shared network file system to a storage device associated with a host computing system. Furthermore, a redo virtual disk file is created in the storage device upon copying the master virtual disk file. Also, changes made to content associated with the VMDK are stored in the redo virtual disk file until the at least one data virtual disk file is copied to the storage device.

19 Claims, 7 Drawing Sheets

DEPLOYMENT OF VIRTUAL MACHINE DISKS FROM A SHARED NETWORK FILE SYSTEM

RELATED APPLICATIONS

Benefit is claimed under 35 U.S.C. 119(a)-(d) to Foreign application Serial No. 3070/CHE/2014 filed in India entitled "DEPLOYMENT OF VIRTUAL MACHINE DISKS FROM A SHARED NETWORK FILE SYSTEM", filed on Jun. 24, 2014, by VMware, Inc., which is herein incorporated in its entirety by reference for all purposes.

TECHNICAL FIELD

The present disclosure relates to methods, techniques, and systems for deployment of virtual machine disks from a shared network file system in a virtualized computing environment.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide hardware resources for VMs. VMs may use virtual machine disks (VMDKs) to store its operating system, program files, applications installed, and other data associated with its activities. The VMDKs that the VMs can access may reside on a virtual machine file system (VMFS) created on a local data store or a VMFS data store connected to host computing systems via fibre channel (FC) switches.

In the virtualized environment, a VM may be deployed on a host or a VM running on a host can access a VMDK after importing/copying the VMDK from a shared location like a shared network file system to a data store associated with the host. The shared location may include a read only copy of the VMDK that the user needs to import to the data store associated with the host for using the VMDK. Further, the VMDK residing on the shared network file system cannot be used directly for the VM since the VMDK can be shared across multiple users or hosts. Also, the shared network file system can be used by multiple users and hence importing operation of the VMDK can be slow. Moreover, the time to import the complete VMDK depends on the size of the VMDK. For example, when the VMDK size is considerably huge (e.g., 30 GB), it may take a significant amount of time to import/copy the complete VMDK from the shared network file system to the data store of the host.

DETAILED DESCRIPTION

Embodiments described herein provide enhanced computer-based and network-based methods, techniques, and systems for deployment of a virtual machine disk (VMDK) in a virtualized computing environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "virtualized computing environment" is used herein to refer to a physical infrastructure that hosts a virtual infrastructure comprising virtual objects such as virtual machines (VMs), virtual data centers (VDCs), virtual appliances, and aggregation of VMs (vApps). For creating/configuring/deploying a VM on a host computing system or for providing a VMDK to an existing VM running on a host computing system, the VMDK needs to be copied from a shared location like a shared network file system (e.g., NFS share and samba share) to a storage device associated with the host computing system. For example, the storage device associated with the host computing system refers to a data store residing in the host computing system or a data store connected to the host computing system via fibre channel (FC) switches.

Typically, the VMDK on the shared network file system is made up of multiple virtual disk files of a predefined size. For example, if the size of each virtual disk file in a VMDK is specified as 2 GB, then the number of virtual disk files in the VMDK depends on the size of the VMDK. Consider a VMDK of size 30 GB that needs to be imported from the shared network file system to the storage device of the host computing system. Typically, the user can use the VMDK only after the complete VMDK of 30 GB is imported. Typically, the multiple virtual disk files of the VMDK can include a master virtual disk file including metadata associated with one or more virtual disk files and the one or more virtual disk files including VM data (e.g., operating system, program files, applications installed, and other data associated with the VM activities).

The present technique copies the master virtual disk file from the shared network file system to the storage device associated with the host computing system when a VMDK deployment operation is triggered. Further, a redo virtual disk file and a snapshot of the VMDK are created in the storage device. Furthermore, the changes made to content associated with the VMDK are stored in the redo virtual disk file until all the data virtual disk files associated with the VMDK are copied to the storage device.

In one example embodiment, a VM is created on the host computing system using the redo virtual disk file which can be used instantly. In another example embodiment, an existing VM running on the host computing system can instantly access the VMDK using the redo virtual disk file and the master virtual disk file. While the VMDK is being used, a copy operation is initiated to copy the entire data virtual disk files associated with the VMDK from the shared network file system to the storage device. After all the virtual disk files are copied to the storage device, the virtual disk files are converted to a single virtual disk format, such as thick or thin disk format needed for storage of the virtual disk files. The redo virtual disk file is then merged/consolidated with a base disk in the single virtual disk format and the snapshot of the VMDK is removed.

The terms "redo virtual disk file" "redo log", "redo file", "delta disk", "snapshot file" and "snapshot delta file" are used interchangeably and are used herein to store changes made to a VMDK while the VM is running. For example, redo virtual disk files save blocks that the VM modifies while it is running. The redo virtual disk file for a VMDK disk in independent-nonpersistent mode is not saved when the VM is powered off or reset, while the redo virtual disk file for a VMDK with a snapshot is saved. In this case, the snapshot captures the entire state of the VM at the time of taking the snapshot. The snapshot includes the state of all the VMDKs, contents of the VM memory, and VM settings. During revert operation of snapshot, the state of the VM reverts back to what it was when a snapshot was taken.

Figure 1:
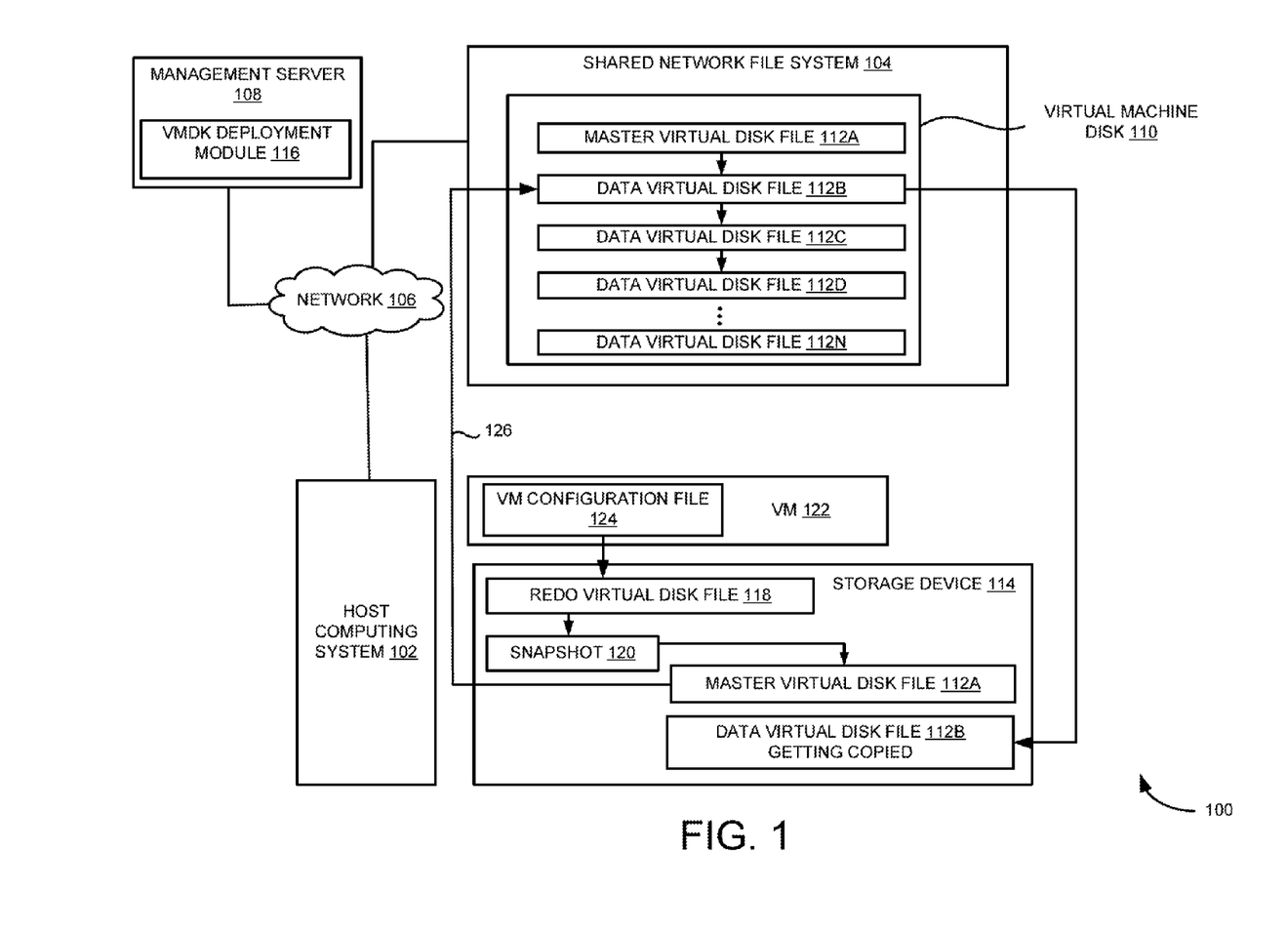
FIG. 1 depicts creating a redo virtual disk file and a snapshot of virtual machine disk (VMDK) in a storage device associated with a host computing system for deployment of the VMDK, according to an example embodiment.

FIG. 1 depicts creating redo virtual disk file 118 and snapshot 120 of VMDK 110 in storage device 114 associated with host computing system 102 for deployment of VMDK 110, according to an example embodiment. In the example shown in FIG. 1, virtualized computing environment 100 includes host computing system 102, storage device 114 associated with host computing system 102, management server 108, and shared network file system 104. Host computing system 102 can include one or more VMs running therein. Further, shared network file system 104 includes VMDK 110 having operating system, program files, applications installed, and other data associated with VM 122. VMDK 110 includes a master virtual disk file 112A and data virtual disk files 112B-N. In one example embodiment, master virtual disk file 112A includes metadata associated with data virtual disk files 112B-N and data virtual disk files 112B-N includes VM data, such as operating system, program files, applications installed and other data associated with VM.

As shown in FIG. 1, host computing system 102 is connected to shared network file system 104 via network 106. In one example, shared network file system 104 can be located on a remote server connected to host computing system 102 via network 106. In the example shown in FIG. 1, virtualized computing environment 100 is described using one host computing systems 102 and one VMDK 110, however, any number of host computing systems and VMDKs can be configured in virtualized computing environment 100 and each VMDK in shared network file system 104 can be shared across multiple host computing systems.

Management server 108 includes VMDK deployment module 116. For example, VMDK deployment module 116 can be part of virtualization management software (VMS) residing in management server 108. One skilled in the art can appreciate that VMDK deployment module 116 can also be provided in a VM or virtual application that can run on any host computing system and can be provided to a user through a graphical user interface as a part of management software.

In operation. VMDK deployment module 116 initiates a VMDK deployment operation upon receiving a request to deploy VMDK 110 to VM 122. For example, VM 122 can be an existing VM running on host computing system 102 or a new VM that needs to be configured on host computing system 102. Further, VMDK deployment module 116 copies master virtual disk file 112A from shared network file system 104 to storage device 114 associated with host computing system 102. In one exemplary implementation, master virtual disk file 112A includes a pointer 126 pointing to data virtual disk file 112B in shared network file system 104.

Further in operation, VMDK deployment module 116 creates redo virtual disk file 118 in storage device 114 upon copying master virtual disk file 112A. In one exemplary implementation, redo virtual disk file 118 includes a pointer pointing to master virtual disk file 112A in storage device 114. In one example embodiment. VMDK deployment module 116 creates redo virtual disk file 118 including a snapshot of a current state of VMDK 110. In this case, redo virtual disk file 118 may include metadata information about data virtual disk files 112B-N. In another example embodiment, VMDK deployment module 116 creates redo virtual disk file 118 and snapshot 120 of a current state of VMDK 110 in storage device 114.

In one example embodiment, VMDK deployment module 116 creates VM 122 on host computing system 102 and provides access to VMDK 110 using redo virtual disk file 118 and master virtual disk file 112A. In another example embodiment, VMDK deployment module 116 allows existing VM 122 to access VMDK 110 using redo virtual disk file 118 and master virtual disk file 112A. VM 122 includes VM configuration file 124 mapping to redo virtual disk file 118. While VMDK 110 is being used, VMDK deployment module 116 substantially simultaneously initiates a copy operation to copy data virtual disk files 112B-N corresponding to VM 122 from shared network file system 104 to storage device 114 using master virtual disk file 112A. Furthermore, VMDK deployment module 116 stores changes made to content associated with VMDK 110 in redo virtual disk file 118 until all data virtual disk files 112B-N associated with VMDK 110 are copied to storage device 114.

Figure 2:
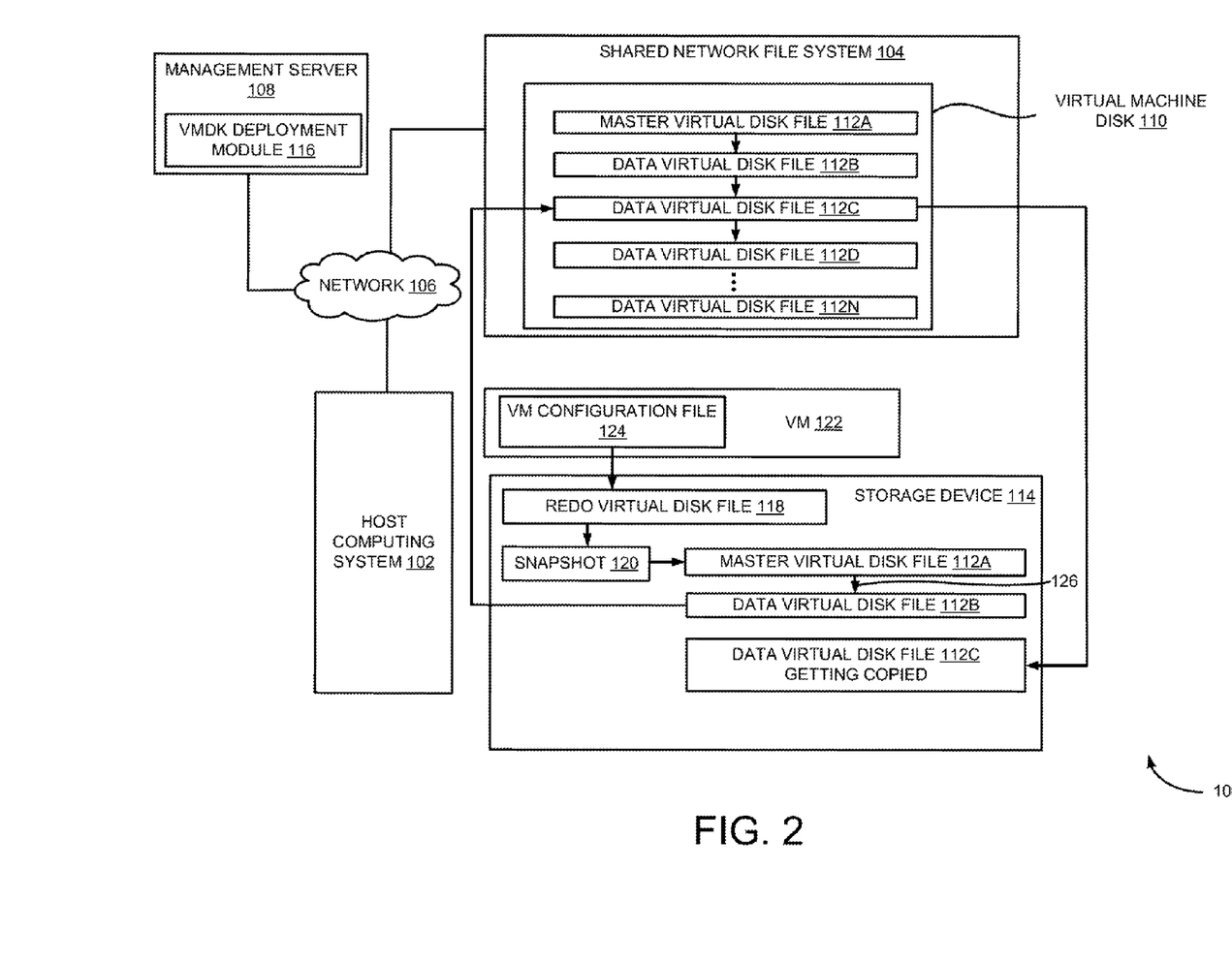
FIG. 2 depicts sequentially copying virtual disk files associated with the VMDK from a shared network file system to the storage device, according to an example embodiment.

FIG. 2 depicts sequentially copying data virtual disk files 112B-N associated with VMDK 110 from shared network file system 104 to storage device 114, according to an example embodiment. In the example shown in FIG. 2, VMDK deployment module 116 copies data virtual disk file 112B pointed by pointer 126 of master virtual disk file 112A from shared network file system 104 to storage device 114. Data virtual disk file 112B includes a pointer pointing to data virtual disk file 112C in shared network file system 104. Further as shown in FIG. 2, VMDK deployment module 116 updates pointer 126 of master virtual disk file 112A to point to data virtual disk file 112B in storage device 114 upon copying data virtual disk file 112B. The steps of copying and updating are repeated until copying of virtual disk files 112A-N is completed.

Figure 3:
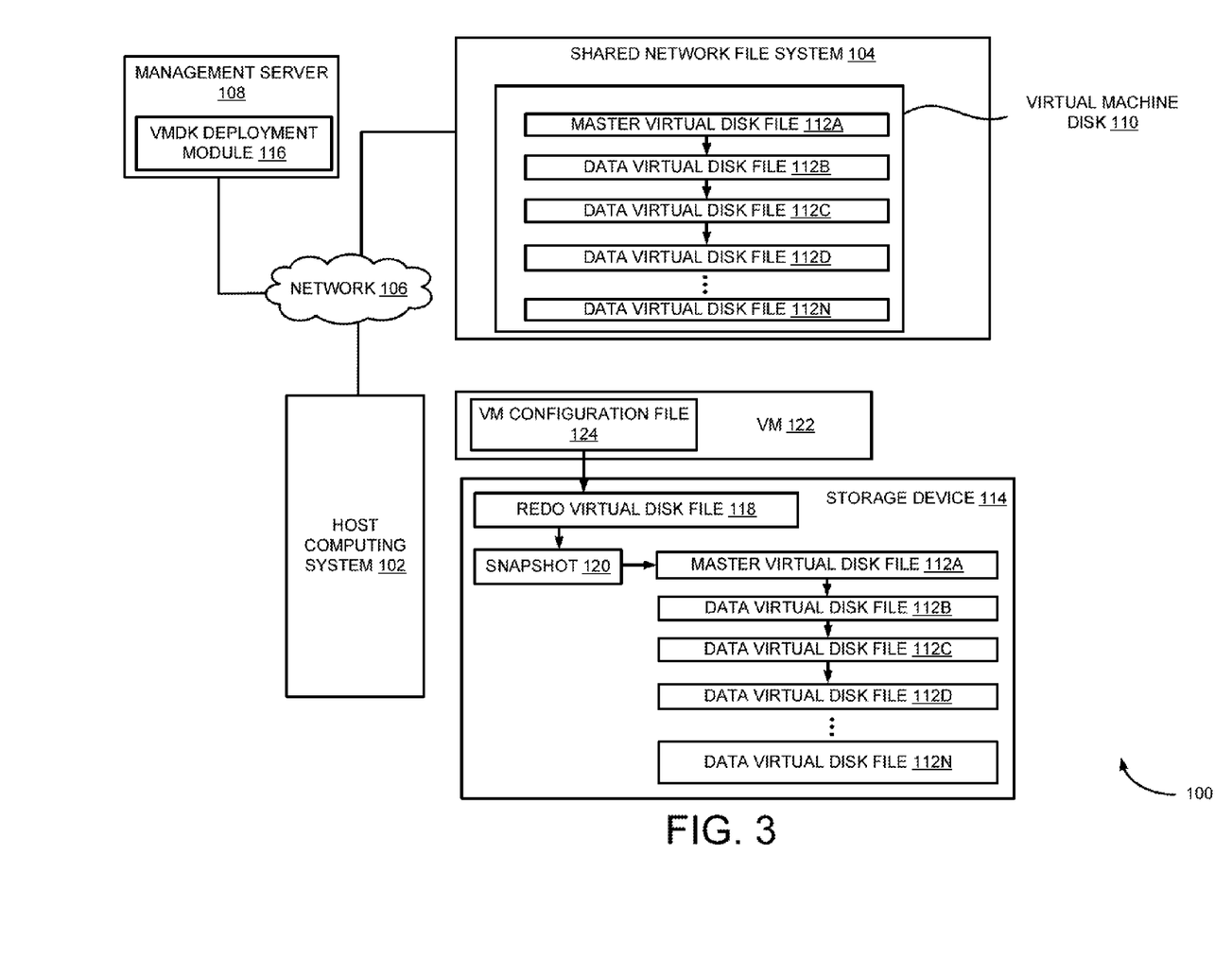
FIG. 3 depicts completion of copying of the virtual disk files associated with the VMDK from the shared network file system to the storage device, according to an example embodiment.

FIG. 3 depicts completion of copying of virtual disk files 112A-N associated with VMDK 110 from shared network file system 104 to storage device 114, according to an example embodiment. After copying of virtual disk files 112A-N is completed, VMDK deployment module 116 removes connections between virtual disk files 112A-N residing in shared network file system 104 and virtual disk files 112A-N residing in storage device 114. Now virtual disk files 112A-N resides in host computing system 102 and host computing system 102 does not have any dependency on shared network file system 104.

Figure 4:
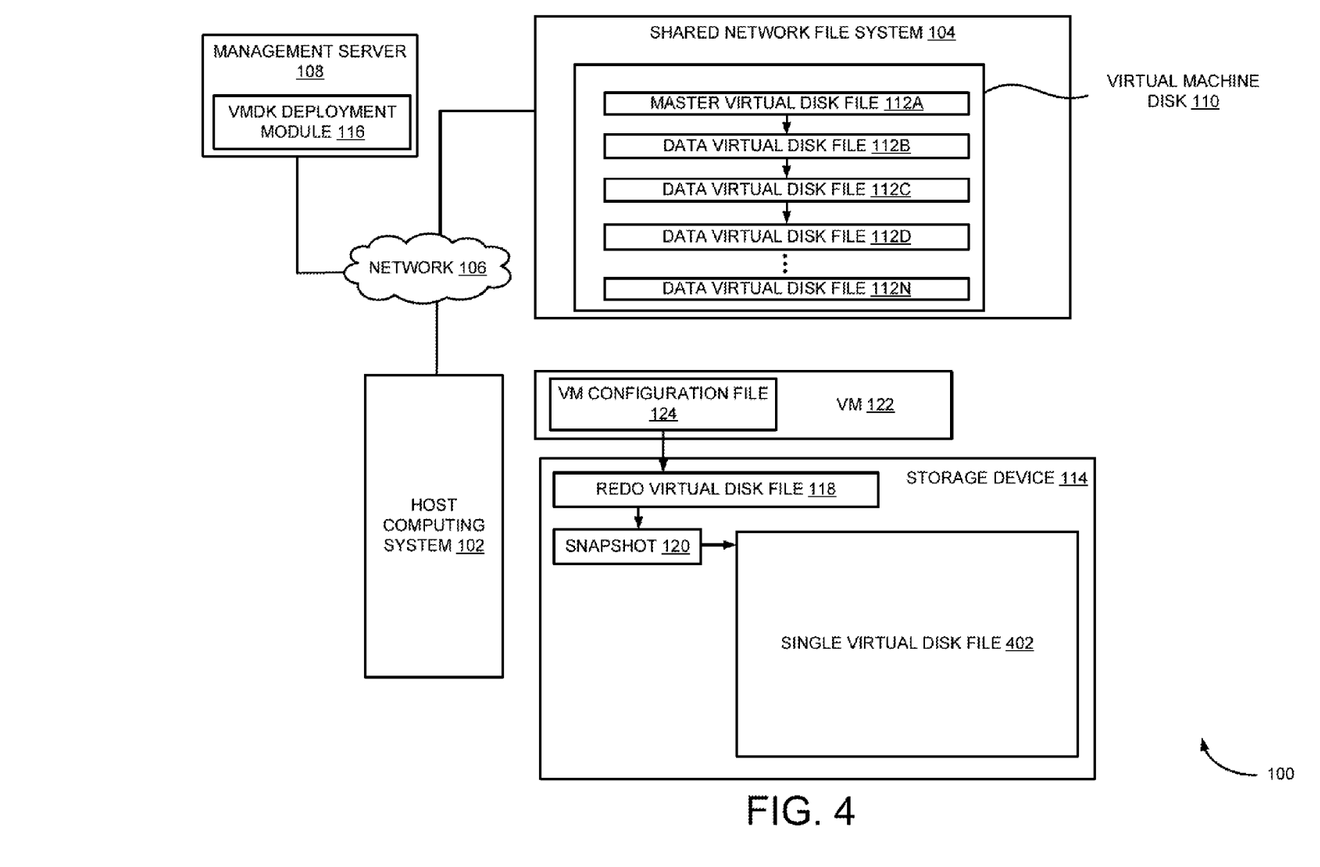
FIG. 4 depicts converting the virtual disk files associated with the VMDK into a single virtual disk file in the storage device upon completion of copying of the virtual disk files, according to an example embodiment.

FIG. 4 depicts converting virtual disk files 112A-N in storage device 114 into single virtual disk file 402 upon copying of virtual disk files 112A-N is completed, according to an example embodiment. Single virtual disk file 402 is in a format, such as a thick or thin provisioned disk, needed for storage of virtual disk files. In thick provisioned disk format, all space required for the virtual disk is allocated when the virtual disk is created and data remaining on the physical device is not erased during creation, but is zeroed out on demand at a later time on first write from the VM. In thin provisioned disk format, space required for the virtual disk can be provisioned based on the value entered for the virtual disk size. As disk write blocks are created, thin disks start small and grow to a preset maximum size. For example, if a VM with a thin 10 GB disk is created, the thin disk initially starts at 1 MB in size and, over time, grows to a maximum size of 10 GB. As shown in FIG. 4, redo virtual disk file 118 including snapshot 120 is mapped to single virtual disk file 402.

Figure 5:
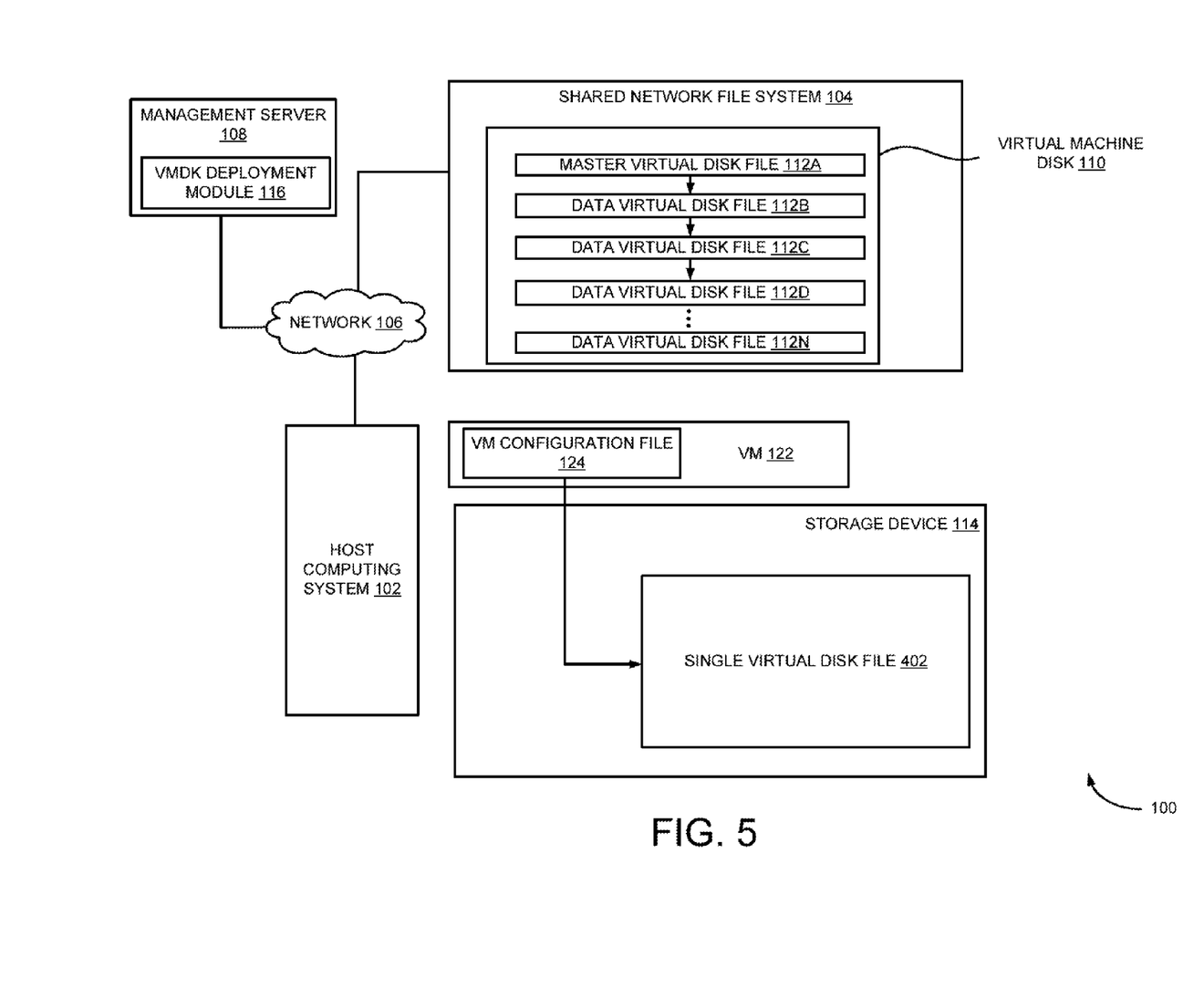
FIG. 5 depicts merging the redo virtual disk file into the single virtual disk file and removing the snapshot, according to an example embodiment.

Now referring to FIG. 5, which depicts merging redo virtual disk file 118 into single virtual disk file 402 and removing snapshot 120, according to an example embodiment. In one embodiment, user data associated with VM 122 is stored in redo virtual disk file 118 until copying of virtual disk files 112A-N to storage device 114 is completed. For example, the user data includes changes made to content associated with VMDK 110 while data virtual disk files 112B-N are being copied to storage device 114. Upon copying of virtual disk files 112A-N to storage device 114 is completed, VMDK deployment module 116 merges/consolidates redo virtual disk file 118 into single virtual disk file 402 using snapshot 120. Upon merging/consolidating redo virtual disk file 118 into single virtual disk file 402, snapshot 120 is removed. Further, VM configuration file 124 of VM 122 is mapped to single virtual disk file 402 as shown in FIG. 5.

Even though FIGS. 1-5 are described using a VMDK having multiple data virtual disk files, it can be noted that the same technique can also be applicable for VMDK having a single data virtual disk file.

Figure 6:
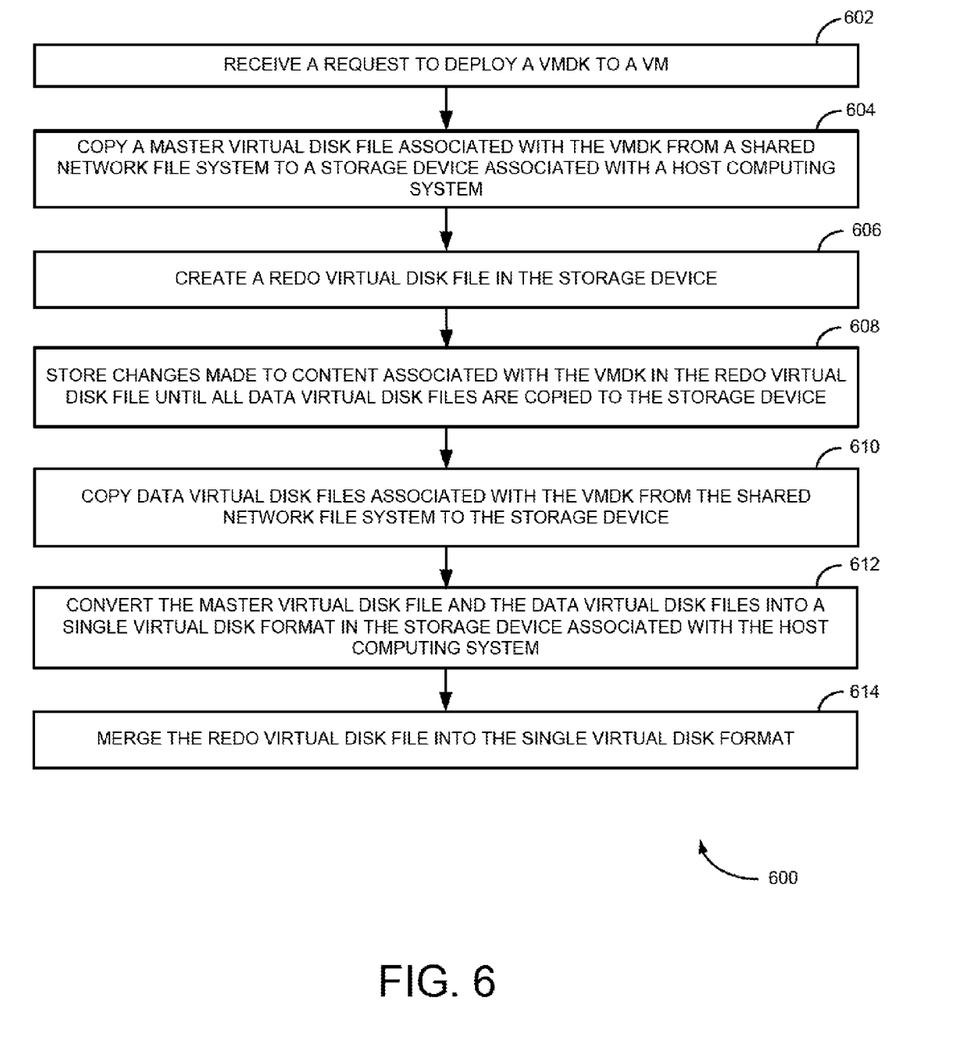
FIG. 6 is a flow chart of an example method for deployment of a VMDK to a virtual machine (VM) in a virtualized computing environment, according to an example embodiment.

FIG. 6 is a flow chart 600 of an example method for deployment of a VMDK to a VM in a virtualized computing environment, according to an example embodiment. At step 602, a request to deploy the VMDK to a VM is received. In one exemplary implementation, a VMDK, which needs to be imported from the shared network file system to the storage device, is made up of a master virtual disk file and at least one data virtual disk file. At step 604, the master virtual disk file is copied from a shared network file system to a storage device associated with a host computing system. The master virtual disk file includes a pointer pointing to the at least one data virtual disk file in the shared network file system. The master virtual disk file includes metadata associated with the virtual disk files and data virtual disk files include virtual machine data.

At step 606, a redo virtual disk file is created in the storage device upon copying the master virtual disk file. The redo virtual disk file includes a pointer pointing to the master virtual disk file in the storage device. In one example, the redo virtual disk file includes a snapshot of the data virtual disk files in the shared network file system. In one example embodiment, the VM is deployed on the host computing system using the redo virtual disk file and the master virtual disk file. In another example embodiment, the VM running on the host computing system is allowed to access the VMDK using the redo virtual disk file and the master virtual disk file. At step 608, changes made to content associated with the VMDK are stored in the redo virtual disk file until all the data virtual disk files are copied to the storage device.

At step 610, the data virtual disk files are copied from the shared network file system to the storage device using the pointer associated with the master virtual disk file. In one exemplary implementation, a first data virtual disk file pointed by the pointer associated with the master virtual disk file is copied from the shared network file system to the storage device. The first data virtual disk file includes a pointer pointing to a next data virtual disk file associated with the VMDK in the shared network file system. Further, the pointer associated with the master virtual disk file is updated to point to the first data virtual disk file in the storage device upon copying the first data virtual disk file to the storage device. The steps of copying the data virtual disk file and updating the pointer are repeated for all the data virtual disk files until all the data virtual disk files associated with the VMDK are copied. In another exemplary implementation, the virtual disk files associated with the VMDK can also be copied in parallel from the shared network file system to the storage device. In one example, when copying of any data virtual disk file is interrupted (e.g., failed due to network connectivity failure) during the copy operation, then the copy operation is resumed from the virtual disk file where the copy operation is interrupted.

At step 612, the master virtual disk file and the data virtual disk files are converted into a single virtual disk format in the storage device upon copying the entire data virtual disk files associated with the VMDK is completed. At step 614, the redo virtual disk file is merged into the single virtual disk format using the pointer associated with the redo virtual disk file. Upon merging, the snapshot can be removed.

In various embodiments, the systems and methods described in FIGS. 1 through 6 propose a technique to deploy a VM on a host computing system or providing a VMDK to an existing VM running on the host computing system using the redo virtual disk file and the master virtual disk file. Using this technique, the VM can use the VMDK without the need to wait for complete VMDK to be copied from the shared network file system to the data store of the host computing system. Therefore, the systems and methods described in FIGS. 1 through 6 enable fast deployment of VM on a host computing system.

Figure 7:
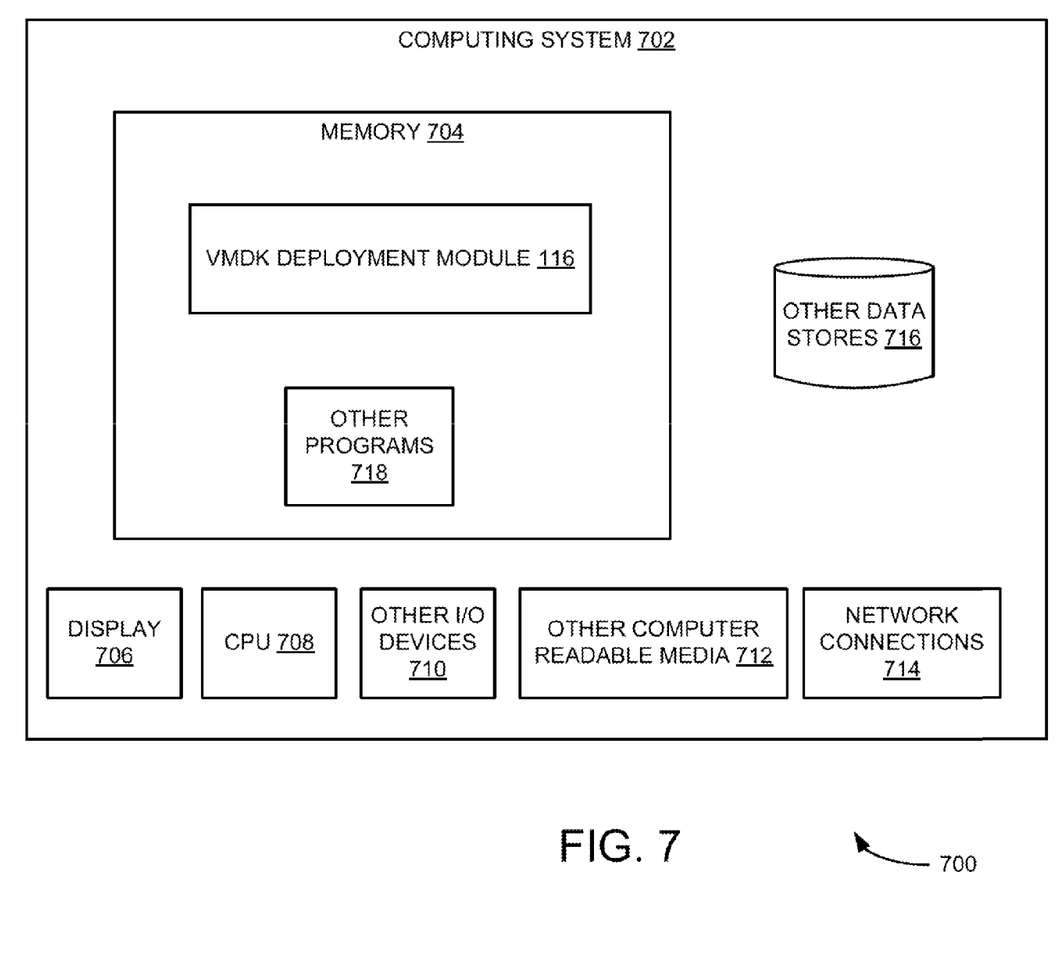
FIG. 7 is an example block diagram of an example physical computing system for implementing a VMDK deployment module, such as the one shown in FIGS. 1-5, according to an example embodiment.

FIG. 7 is block diagram 700 of example physical computing system 702 (e.g., management server 108 shown in FIGS. 1-5) including VMDK deployment module 116 according to an example embodiment. In particular, FIG. 7 shows computing system 702 that may be utilized to implement VMDK deployment module 116. Note that one or more general purpose virtual or physical computer systems suitably instructed may be used to implement VMDK deployment module 116. In addition, computing system 702 may comprise one or more distinct computing systems/devices and may span distributed locations.

In the embodiment shown, computing system 702 may comprise computer memory ("memory") 704, display 706, one or more Central Processing Units ("CPU") 708, input/output devices 710 (e.g., keyboard, mouse, etc.), other computer-readable media 712, and network connections 714. VMDK deployment module 116 is shown residing in memory 704. The components of VMDK deployment module 116 may execute on one or more CPUs 708 and implement techniques described herein. Other code or programs 718 (e.g., an administrative interface, a Web server, and the like) may also reside in memory 704, and execute on one or more CPUs 708. Further, other data repositories, such as data store 716, may also reside in computing system 702. One or more of the components in FIG. 7 may not be present in any specific implementation. For example, some embodiments may not provide other computer readable media 712 and/or display 706.

VMDK deployment module 116 interacts via network with host computing systems in the cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of VMDK deployment module 116, such as in data store 716, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of VMDK deployment module 116 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. A method, comprising:
   receiving, by a virtual machine disk (VMDK) deployment module residing in memory and executed by a processor, a request to deploy a VMDK to a virtual machine (VM), the VMDK comprising a master virtual disk file and at least one data virtual disk file;
   copying, by the VMDK deployment module, the master virtual disk file from a shared network file system to a storage device associated with the host computing system, the master virtual disk file comprising a pointer pointing to the at least one data virtual disk file in the shared network file system;
   creating, by the VMDK deployment module, a redo virtual disk file in the storage device upon copying the master virtual disk file, the redo virtual disk file comprising a pointer pointing to the master virtual disk file in the storage device;
   performing one of deploying the VM on the host computing system and allowing the VM running on the host computing system to access the VMDK using the redo virtual disk file and the master virtual disk file; and
   storing, by the VMDK deployment module, changes made to content associated with the VMDK in the redo virtual disk file until the at least one data virtual disk file is copied to the storage device.

2. The method of claim 1, further comprising:
   copying the at least one data virtual disk file from the shared network file system to the storage device using the pointer associated with the master virtual disk file.

3. The method of claim 2, wherein copying the at least one data virtual disk file from the shared network file system to the storage device using the pointer associated with the master virtual disk file, comprises:
   copying a first data virtual disk file pointed by the pointer associated with the master virtual disk file from the shared network file system to the storage device, the first data virtual disk file comprises a pointer pointing to a next data virtual disk file associated with the VMDK in the shared network file system;
   updating the pointer associated with the master virtual disk file to point to the first data virtual disk file in the storage device upon copying the first data virtual disk file to the storage device; and
   repeating the steps of copying the next data virtual disk file and updating pointer for all data virtual disk files until copying of all the data virtual disk files associated with the VMDK is completed.

4. The method of claim 2, further comprising:
   converting the master virtual disk file and at least one data virtual disk file into a single virtual disk format in the storage device associated with the host computing system upon copying of all data virtual disk files associated with the VMDK is completed.

5. The method of claim 4, further comprising:
   merging the redo virtual disk file into the single virtual disk format using the pointer associated with the redo virtual disk file.

6. The method of claim 1, wherein the master virtual disk file comprises metadata associated with the at least one data virtual disk file and the at least one data virtual disk file comprises virtual machine data.

7. The method of claim 1, wherein creating the redo virtual disk file in the storage device upon copying the master virtual disk file comprises:
   creating the redo virtual disk file including a snapshot of the at least one data virtual disk file in the shared network file system.

8. A system comprising:
   a shared network file system;

a host computing system communicatively coupled to the shared network file system;

a management server comprising a processor and memory coupled to the processor, wherein the memory includes a virtual machine disk (VMDK) deployment module having instructions to:

receive a request to deploy a VMDK to a virtual machine (VM), the VMDK comprising a master virtual disk file and at least one data virtual disk file;

copy the master virtual disk file from the shared network file system to a storage device associated with the host computing system, the master virtual disk file comprising a pointer pointing to the at least one data virtual disk file in the shared network file system;

create a redo virtual disk file in the storage device upon copying the master virtual disk file, the redo virtual disk file comprising a pointer pointing to the master virtual disk file in the storage device;

perform one of deploying the VM on the host computing system and allowing the VM running on the host computing system to access the VMDK using the redo virtual disk file and the master virtual disk file; and store changes made to content associated with the VMDK in the redo virtual disk file until the at least one data virtual disk file is copied to the storage device.

9. The system of claim 8, wherein the VMDK deployment module is further configured to:

copy the at least one data virtual disk file from the shared network file system to the storage device using the pointer associated with the master virtual disk file.

10. The system of claim 9, wherein the VMDK deployment module is configured to:

copy a first data virtual disk file pointed by the pointer associated with the master virtual disk file from the shared network file system to the storage device, the first data virtual disk file comprises a pointer pointing to a next data virtual disk the associated with the VMDK in the shared network file system;

update the pointer associated with the master virtual disk file to point to the first data virtual disk file in the storage device upon copying the first data virtual disk file to the storage device; and repeat the steps of copying the next data virtual disk file and updating pointer for all data virtual disk files until copying of all the data virtual disk files associated with the VMDK is completed.

11. The system of claim 9, wherein the VMDK deployment module is configured to:

convert the master virtual disk file and at least one data virtual disk file into a single virtual disk format in the storage device associated with the host computing system upon copying of all data virtual disk files associated with the VMDK is completed.

12. The system of claim 11, wherein the VMDK deployment module is configured to:

merge the redo virtual disk file into the single virtual disk format using the pointer associated with the redo virtual disk file.

13. The system of claim 8, wherein the master virtual disk file comprises metadata associated with the at least one data virtual disk file and the at least one data virtual disk file comprises virtual machine data.

14. A non-transitory computer readable storage medium comprising instructions executable by at least one processor resource to:

receive a request to deploy a virtual machine disk (VMDK) to a virtual machine VM), the VMDK comprising a master virtual disk file and at least one data virtual disk files;

copy the master virtual disk file from a shared network file system to a storage device associated with a host computing system, the master virtual disk file comprising a pointer pointing to the at least one data virtual disk file in the shared network file system;

create a redo virtual disk file in the storage device upon copying the master virtual disk file, the redo virtual disk file comprising a pointer pointing to the master virtual disk file in the storage device;

perform one of deploying the VM on the host computing stem and allowing the VM running on the host computing system to access the VMDK using the redo virtual disk file and the master virtual disk file; and store changes made to content associated with the VMDK in the redo virtual disk file until the at least one data virtual disk file is copied to the storage device.

15. The non-transitory computer-readable storage medium of claim 14, further comprising instructions to:

copy the at least one data virtual disk file from the shared network file system to the storage device using the pointer associated with the master virtual disk file.

16. The non-transitory computer-readable storage medium of claim 15, wherein copying the at least one data virtual disk file from the shared network file system to the storage device using the pointer associated with the master virtual disk file, comprises:

copying a first data virtual disk file pointed by the pointer associated with the master virtual disk file from the shared network file system to the storage device, the first data virtual disk file comprises a pointer pointing to a next data virtual disk file associated with the VMDK in the shared network file system;

updating the pointer associated with the master virtual disk file to point to the first data virtual disk file in the storage device upon copying the first data virtual disk file to the storage device; and repeating the steps of copying the next data virtual disk file and updating pointer for all data virtual disk files until copying of all the data virtual disk files associated with the VMDK is completed.

17. The non-transitory computer-readable storage medium of claim 15, further comprising instructions to:

convert the master virtual disk file and at least one data virtual disk file into a single virtual disk format in the storage device associated with the host computing system upon copying of all data virtual disk files associated with the VMDK is completed.

18. The non-transitory computer-readable storage medium of claim 17, further comprising instructions to:

merge the redo virtual disk file into the single virtual disk format using the pointer associated with the redo virtual disk file.

19. The non-transitory computer-readable storage medium of claim 14, wherein the master virtual disk file comprises metadata associated with the at least one data virtual disk file and the at least one data virtual disk file comprises virtual machine data.

* * * * *